United States Patent [19]

Schelle

[11] 3,817,400

[45] June 18, 1974

[54] SPRING ELEMENT FOR AUTOMATIC CENTER HEAD COUPLERS OF RAILROAD VEHICLES

[75] Inventor: Axel Schelle, Rottach-Scherfen, Germany

[73] Assignee: Knorr-Bremse KG, Berlin and Munich, Germany

[22] Filed: Aug. 22, 1972

[21] Appl. No.: 282,669

[30] Foreign Application Priority Data
Aug. 31, 1971 Germany............................ 2143563

[52] U.S. Cl......................... 213/24, 213/20, 213/32
[51] Int. Cl.......................... B61g 9/18, B61g 11/14
[58] Field of Search............. 213/22, 24, 32, 36, 20

[56] References Cited
UNITED STATES PATENTS

| | | | |
|---|---|---|---|
| 1,673,507 | 6/1928 | Haseltine | 213/22 |
| 2,360,566 | 10/1944 | Kinne | 213/32 R |
| 2,692,057 | 10/1954 | Dentler | 213/22 |
| 3,468,432 | 9/1969 | Baillie | 213/22 |

Primary Examiner—Drayton E. Hoffman
Attorney, Agent, or Firm—Emund M. Jaskiewicz

[57] ABSTRACT

A spring element has a thrust member which is insertable axially into a sleeve against spring and friction forces and is coupled by force transmitting wedge means to a friction element. The friction element has a pressure surface which moves along a correspondingly shaped friction surface on the inner face of the sleeve. The pressure surface and the sleeve friction surface extend in the direction of insertion of the thrust member and the sleeve friction surface has a convex curvature. Insertion of the thrust member will cause the friction element to move over the sleeve friction surface to generate friction forces acting against the thrust member.

6 Claims, 3 Drawing Figures

SPRING ELEMENT FOR AUTOMATIC CENTER HEAD COUPLERS OF RAILROAD VEHICLES

The present invention relates to a spring element which is adapted for automatic center head couplers of railroad vehicles, more particularly, to the structure within the sleeve element for generating relatively high damping effects and high absorption of energy upon relatively low loads upon the spring element.

It is known to construct spring elements which are particularly adapted for automatic center head couplers of railroad vehicles wherein the cooperating pressure and friction surfaces extend in a straight line in the direction of insertion of a thrust member. In such spring elements the friction force between the thrust member and the sleeve and as a result the frictional forces which act against the thrust member and the damping of the spring element increase linearly as the load upon the thrust member increases. As a result, a high damping value and a high absorption of energy can be obtained with the spring elements only when relatively high loads are imposed upon them. However, it has been found that the spring elements employed in the traction and thrust devices of automatic center head couplers for railroad vehicles would be more advantageous if a high damping and high energy absorption could be obtained at relatively low loads imposed upon the spring element. As far as it is known, up to the present time this desired characteristic of damping an energy absorption with respect to the loads has not been obtained in spring elements for such automatic center head couplers. In order to obtain such high damping effects and high absorption of energy at relatively low loads it was necessary to provide special control elements in hydraulic spring elements or to use spring elements elastomeric devices as spring or damping means.

It is therefore the principal object of the present invention to provide a novel and improved spring element which is particularly adapted for automatic center head couplers of railroad vehicles.

It is another object of the present invention to provide such a spring element which provides for high damping and high energy absorption values mechanically without any use of fluids or elastomeric structures when relatively low loads are imposed upon the spring element.

It is a further object of the present invention to provide such a spring element by which it is possible to obtain high damping and high energy absorption values when low loads are imposed on a spring element and which values do not increase linearly with increased loads on the spring element.

The objects of the present invention are obtained and the disadvantages of the prior art are overcome by the herein disclosed spring element. According to one aspect of the present invention a spring element which is particularly adapted for automatic center head couplers of railroad vehicles comprises a sleeve which has a friction surface on its inner face. A thrust member is insertable into the sleeve in an axial direction and acts against spring and friction forces generated within the sleeve. Within the sleeve there is provided friction element means which has a pressure surface movable over the sleeve friction surface. Force transmitting wedge means are provided for transmitting forces between the thrust member and the friction element means. The pressure surface on the friction element means and the sleeve friction surface both extend in an axial direction with respect to the sleeve. The sleeve friction surface has a convex curvature in the axial direction of the sleeve and the friction element pressure surface has a curvature conforming to this convex curvature.

Other objects and advantages of the present invention will be apparent upon reference to the accompanying description when taken in conjunction with the following drawings, which are examplary, wherein.

Proceeding next to the drawings wherein like reference symbols indicate the same parts throughout the various views a specific embodiment of the present invention will be described in detail.

Figure 1:
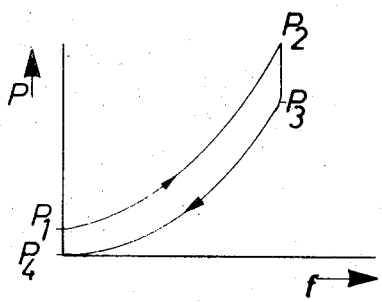
FIG. 1 is a graph showing the force-displacement characteristics of a known spring element.
Figure 2:
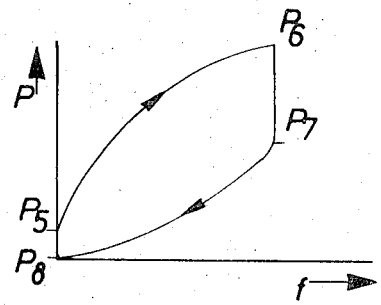
FIG. 2 is a graph showing the force-displacement characteristics of the spring element in accordance with the present invention.

In the diagrams of FIGS. 1 and 2, the force P which is applied to the spring element to load the spring element is plotted against the spring force $f$ exerted by the spring element. Since it can be assumed that the spring element utilizes a compression spring having a slightly progressive characteristic, the known spring element as shown in FIG. 1 will begin to exert a spring action when the load force reaches a value $P_1$. As the load P increases, the inner spring action increases at a continuously decreasing spring displacement as illustrated by the curve $P_1 - P_2$, indicating the progressive characteristic of the spring.

The force P has a spring force component and a friction force component which are always at the same ratio with respect to each other.

When the load on the spring element is reduced from the force $P_2$ to a force $P_3$, the compression spring within the spring element will not expand. However, when the load drops below the force $P_3$ the compression spring will begin to expand and the spring action exerted by the spring element will reduce according to the curve $P_3-P_4$.

The vertical distance between the two curves $P_1-P_2$ and $P_3-P_4$ indicates the friction force between the thrust piece and the sleeve which is overcome by the inner spring action of the spring element. Therefore, the area defined by $P_1-P_2-P_3-P_4$ corresponds to the friction energy absorbed by the spring element during the inward spring action and accordingly to the damping of the spring element. Since this area is relatively small it is apparent that the energy absorption of the spring element is also small.

The diagram in FIG. 2 illustrates the force characteristic which is desirable for spring elements to be employed in automatic center head couplers of railroad vehicles and like applications.

After an initial force $P_5$ has been attained, a progressive increase occurs in the spring displacement $f$ but not in the force P as indicated in the curve $P_5-P_6$. If the load is removed from the spring element after the load $P_6$ has been attained, the load can be reduced to the value $P_7$ before the spring element begins to expand. Only after the load drops below the value $P_7$ will the spring element move in accordance with the curve $P_7-P_8$ which corresponds basically to the curve $P_3-P_4$ of FIG. 1.

Because of the progressively increasing spring displacement $f$ as the load is increased a spring element possessing the force characteristic of FIG. 2 is able to absorb a substantially larger energy than known spring elements as indicated by the area enclosed by $P_5$–$P_6$–$P_7$–$P_8$.

Figure 3:
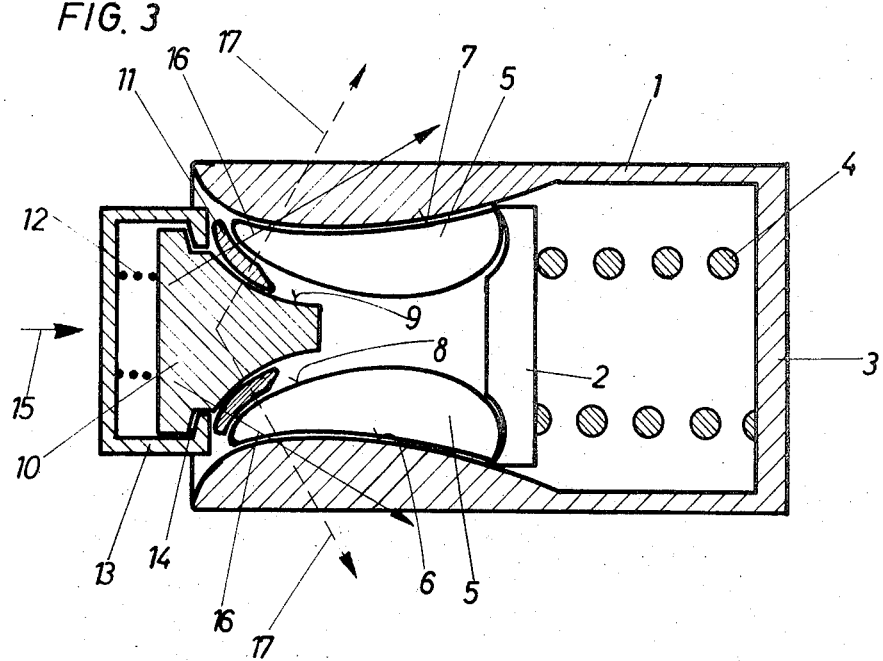
FIG. 3 is a longitudinal sectional view of the spring element according to the present invention.

The spring element as illustrated in FIG. 3 and constructed in accordance with the present invention has a force characteristic which corresponds to the diagram of FIG. 2. This force characteristic is obtained by the relationship between the load exerted on the spring element and the pressure exerted by the thrust member against the sleeve which forms the outer casing of the spring element.

The spring element of FIG. 3 comprises a substantially cylindrical sleeve 1 closed at one end 3 and having a plate 2 therein which is axially displaceable within the sleeve. A compression spring 4 is positioned between closed end 3 and plate 2.

On the side of the plate 2 away from spring 4 there are positioned a plurality of friction pieces 5 which are uniformly spaced over the inner surface of sleeve 1 and whose ends contact the plate 2 in the vicinity of of its outer edge. The inner face of sleeve 1 is provided with a friction surface 6 which has a slight convex curvature in the axial direction of the sleeve. The friction elements 5 each have pressure surfaces 7 which have a curvature conforming to that of the friction surfaces 6 so as to be in close contact with these friction surfaces.

The ends of friction elements 5 away from the plate 2 are provided with wedge surfaces 8 that have a convex curvature in the axial direction of the sleeve 1. The wedge surfaces 8 cooperate with wedge surfaces 9 on a regulating member 10. The wedge surfaces 9 have a concave curvature which corresponds to the convex curvature of wedge surfaces 8.

Between the wedge surfaces 8 and 9 there are disposed a plurality of intermediate elements whose length is quite short as compared with the length of wedge surfaces 8 and 9. The wedge surfaces 8 and 9 together with the intermediate elements 11 define an expansible assembly for transmitting forces between the regulating part 10 and the friction elements 5. The expansible effect will vary depending on the position of the intermediate elements 11 with respect to the wedge surfaces 8 and 9.

On its side away from its wedge surfaces 9, the regulating member 10 is loaded by a pretensioned spring 12 that is supported against an outer member 13. The outer member 13 has a portion which extands over the regulating member 10 and is provided with a plurality of abutments or lips 14 which retain the regulator member 10 within the outer member 13 against the force of the spring 12. A cage or separator which is not shown in the drawings guides the intermediate elements 11 on the outer member 13 so that the intermediate elements 11 are capable of radial displacement but are not capable of axial displacement with respect to the sleeve 1.

When no force is applied to the spring element the components of the element are in the positions as illustrated in FIG. 3. The outer member 13 is mounted for axial displacement within the sleeve 1 by means of structure which is not shown in the drawings and is restrained against axial movement outwardly of the sleeve also by structure not shown. The compression spring 4 in this position is provided with a predetermined initial tension.

The regulator member 10 together with the outer member 2 and spring 12 constitute a thrust member against which an external force P is applied and which thrust member is insertable within the sleeve 1 in an axial direction thereof.

While the sleeve 1 is retained in a stationary position and a gradually increasing force is applied in the direction of arrow 15 against outer member 13, the outer member 13, spring 12 and regulator member 10 which constitute the thrust member are urged into the sleeve 1 as soon as the initial tension of compression spring 4 is overcome by the force on arrow 15. The intermediate elements 11 are in contact with those portions of wedge surfaces 8 and 9 which are steeply inclined with respect to the axial direction of sleeve 1 and transmit the forces acting in the direction of arrow 15 as a reaction force acting in the direction of arrow 16 on friction elements 5. As indicated by the direction of arrow 16, the reaction forces are only slightly inclined with respect to the axial direction of sleeve 1 so that the friction elements 5 with their pressure surfaces 7 are pressed against friction surfaces 6 only by a low force component.

When outer member 13 is pushed within sleeve 1, it will carry along friction elements 5 and plate 2 while spring 4 is being compressed. The friction occurring between friction elements 5 and sleeve 1 brings about an energy absorption of the spring element.

As the insertion of outer member 13 into the sleeve 1 increases, friction elements 5 contact those portions of friction surfaces 6 which increasingly diverge from the axial direction of sleeve 1. Thus, the energy to be applied for shifting the friction elements does not increase in proportion to the force loading the spring element but its ratio to this loading force is reduced as the outer member 13 is displaced further into the sleeve 1. This characteristic of the spring element is indicated between the forces $P_5$ and $P_6$ of FIG. 2 which has a progressive path with respect to the spring displacement.

If the load on the spring element is reduced, the compression spring 4 is not capable of pushing friction elements 5 and outer member 13 to the left as viewed in FIG. 2 because of the friction of the friction elements. Only when the load on the spring element is reduced to the value $P_7$ of FIG. 2, can the compression spring 4 push plate 2, friction elements 5, regulating member 10 by means of intermediate elements 11 and outer member 13 by means of spring 12 to the left as viewed in FIG. 3. This movement to the left of these elements will continue until all of the components reach their positions as illustrated in FIG. 3.

In the event a force loading the spring element in the direction of arrow 15 is applied rapidly so as to be in the form of shocks or impacts, the regulating member 10 will initially remain in place because of its mass inertia but the outer member 13 will move slightly to the right as seen in FIG. 3. While the abutments 14 are disengaged from the regulating member 10 the spring 12 will be compressed. The intermediate elements 11 are guided to move between wedge surfaces 8 and 9 to the right to reach those portions of wedge surfaces 8 and 9 that are slightly inclined with respect to the axial direction of sleeve 1. The regulating member 10 will also be moved to the right by spring 12 only after the intermediate elements 11 are pressed between the wedge surfaces 8 and 9 and transmit a reaction force on friction elements 5 in the direction of arrows 17. With respect to the above mentioned reaction forces indicated by the arrows 16, the reaction forces 17 are more steeply inclined with respect to the axial direction of sleeve 1. Accordingly, friction elements 5 are pressed with their friction surfaces 7 strongly against sleeve friction surfaces 6 and a corresponding high friction energy must be applied for displacing the friction elements 5. It is apparent that as the insertion of outer member 13 within the sleeve 1 increases, the ratio between the friction energy to be applied for this insertion and the force loading the spring element is also reduced in this case.

As the load on the spring element is subsequently removed, the components of the spring element will return into the position shown in FIG. 3. As a result, the frictional coupling between wedge surfaces 8 and 9 and intermediate elements 11 is finally disengaged and the intermediate elements 11 are again pulled into their position with respect to wedge surfaces 8 and 9 as shown since the spring 12 will move the outer member 13 away from regulating member 10.

During the displacement action of the spring element, those portions of friction element 5 in contact with the plate 2 are shifted radially with respect to the plate 2. According to the present invention one can provide such a bearing relationship between friction elements 5 and plate 2 that the mutual position of contact between them is shifted with respect to friction elements 5 during displacement of the spring element. Because of the disposition of forces acting on friction elements 5, a torque will be produced on the friction elements 5 that may be employed for a desired variation of friction between friction surfaces 6 and pressure surfaces 7. The friction properties and the energy absorption of the spring element can thus be modified further according to a particular application or to specific conditions.

It is apparent that the regulator member 10 which is responsive to the magnitude of shock or impact loads acting on the spring element positions the intermediate elements on a portion of the wedge surfaces which are steeply inclined with respect to the axial direction of the sleeve in the case of low shock loads and on a portion of the wedge surfaces which are slightly inclined with respect to the axial direction of the sleeve in the case of high shock loads. The regulator member 10 is thus essentially a spring-mass regulator.

The thrust piece of the spring element is constituted by the outer member 13 within which is supported the spring-mass regulator 10. The outer member 13 is subjected directly to shock loads imposed upon the spring element and is coupled by means of its abutments 14 with the intermediate elements 5 in the direction of displacement toward the wedge surfaces. The outer member also displaceably supports the regulating member 10 by means of a pretensioned spring. The wedge surfaces 9 of the thrust piece are thus carried by the regulator 10 and the regulator member is also supported within the outer member by the abutments.

Thus it can be seen that the present invention has disclosed a spring element wherein a relatively large force is required to initially displace the spring element and this force progressively decreases as the displacement of the element increases. This force characteristic for various thrust and impact applications such as encounted in railroad applications and particularly in automatic center head couplers.

It will be understood that this invention is susceptible to modification in order to adapt it to different usages and conditions, and accordingly, it is desired to comprehend such modifications within this invention as may fall within the scope of the appended claims.

What is claimed is:

1. A spring element particularly adapted for automatic center head couplers of railroad vehicles comprising a sleeve having a friction surface on the inner face thereof, and spring means therein to generate spring forces, friction element means within said sleeve and having a pressure surface movable over said sleeve friction surface to generate friction forces, thrust member means insertable into one end of said sleeve in an axially direction towards said friction element means upon application of a load thereto and acting against said spring and friction forces within said sleeve, means between said thrust member means and said friction element means for transmitting force therebetween, said pressure surface and said sleeve friction surface extending substantially axially of said sleeve, said sleeve friction surface having a convex curvature in the axial direction of said sleeve such that the ratio of the friction forces with respect to the load applied to the thrust member means decreases as the thrust member means is displaced further into the sleeve.

2. A spring element as claimed in claim 1 wherein said pressure surface has a curvature conforming to that of said sleeve friction surface.

3. A spring element as claimed in claim 2 wherein said force transmitting means comprises cooperating curved wedge surfaces on said thrust member and said friction element means, and an intermediate element displaceably disposed between said cooperating wedge surfaces and having a length substantially shorter than that of said wedge surfaces.

4. A spring element as claimed in claim 3 wherein said thrust member includes regulator means responsive to the magnitude of shock loads acting on the spring element for positioning said intermediate element on a portion of the wedge surfaces which are steeply inclined with respect to the axial direction of the sleeve in the case of low shock loads and onto a portion of the wedge surfaces which are slightly inclined in the case of high shock loads.

5. A spring element as claimed in claim 4 wherein the wedge surface on the friction element means has a convex curvature in the axial direction of the sleeve.

6. A spring element as claimed in claim 4 wherein said regulator means comprises an outer member subjected directly to shock loads, guide means coupling said outer member to said intermediate element, a regulating member resiliently mounted within said outer member and having thereon the wedge surface of the thrust member, and a plurality of abutments on said outer member retaining said regulating member therein.

* * * * *